US008503028B2

(12) United States Patent
Yamazaki

(10) Patent No.: US 8,503,028 B2
(45) Date of Patent: Aug. 6, 2013

(54) IMAGE FORMING APPARATUS AND IMAGE FORMING SYSTEM

(75) Inventor: Masataka Yamazaki, Kuwana (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 488 days.

(21) Appl. No.: 12/750,041

(22) Filed: Mar. 30, 2010

(65) Prior Publication Data

US 2010/0302563 A1 Dec. 2, 2010

(30) Foreign Application Priority Data

May 29, 2009 (JP) ................................ 2009-131288

(51) Int. Cl.
*G06F 15/00* (2006.01)

(52) U.S. Cl.
USPC .......................................... 358/1.9; 358/448

(58) Field of Classification Search
None
See application file for complete search history.

(56) References Cited

U.S. PATENT DOCUMENTS

| | | | | |
|---|---|---|---|---|
| 7,426,352 | B2 | 9/2008 | Moriyama et al. | |
| 7,440,706 | B2 | 10/2008 | Moriyama et al. | |
| 2004/0136025 | A1* | 7/2004 | Moriyama et al. | 358/1.14 |
| 2006/0171001 | A1 | 8/2006 | Kitagawa et al. | |
| 2007/0212141 | A1 | 9/2007 | Hamahashi | |
| 2008/0075488 | A1 | 3/2008 | Moriyama et al. | |
| 2008/0130030 | A1* | 6/2008 | Okunishi et al. | 358/1.9 |

FOREIGN PATENT DOCUMENTS

| | | | |
|---|---|---|---|
| JP | 07-246739 | | 9/1995 |
| JP | 11-284818 | | 10/1999 |
| JP | 2004-142250 | A | 5/2004 |
| JP | 2004-347927 | A | 12/2004 |
| JP | 2006-212894 | A | 8/2006 |
| JP | 2007-065377 | A | 3/2007 |
| JP | 2008-102201 | A | 5/2008 |
| JP | 2008-139484 | A | 6/2008 |
| JP | 2009-086398 | A | 4/2009 |

OTHER PUBLICATIONS

JP Office Action dated Sep. 29, 2011, corresponding Application No. JP 2009-131288; English Translation.

JP Office Action dtd Apr. 19, 2011, JP Appln. 2009-131288, English translation.

Extended EP Search Report dtd Nov. 18, 2011, EP Appln. 10003393.5.

* cited by examiner

*Primary Examiner* — Twyler Haskins
*Assistant Examiner* — Helen Q Zong
(74) *Attorney, Agent, or Firm* — Banner & Witcoff, Ltd.

(57) ABSTRACT

An image forming apparatus having an accepting unit; a printing unit, which performs a high-speed double-sided print processing operation to print an image on a second recording medium during a period between when a first side of a first recording medium is printed and when a second side of the first recording medium is printed; an adjustment unit, which performs an image quality adjustment; a determination unit that determines whether adjustment execution conditions will be fulfilled during performance of the high-speed double-sided print processing operation before the high-speed double-sided print processing operation is initiated; and a control unit, which controls the adjustment unit to perform the image quality adjustment before initiation of the high-speed double-sided print processing operation, when the determination unit determines that the adjustment execution conditions will be fulfilled.

11 Claims, 7 Drawing Sheets

IMAGE FORMING APPARATUS AND IMAGE FORMING SYSTEM

CROSS REFERENCE TO RELATED APPLICATION

The present application claims priority from Japanese Patent Application NO. 2009-131288, which was filed on May 29, 2009, the disclosure of which is incorporated herein by reference in its entirety.

BACKGROUND

The present invention relates to an image forming apparatus and an image forming system and, more particularly, to an image forming apparatus and an image forming system having that may perform high-speed double-sided printing.

Commonly-used double-sided printing schemes include individual double-sided printing involving sequentially subjecting a plurality of sheets to double-sided printing one at a time and high-speed double-sided printing involving subjecting a plurality of sheets to double-sided printing at high speed with at least one second sheet undergoing printing on one side between when a first side of a first sheet is printed and a second side of the first sheet is printed.

During individual double-sided printing, after one side of a single sheet has undergone printing, the sheet is inverted so that the other side of the sheet can be printed. The next sheet then undergoes printing, one side at a time. For instance, when a print job involving printing 10 (1P-10P) pages of images on five sheets is performed using individual double-sided printing, the respective pages are printed in sequence of 2P (second page), 1P (first page; completion of first sheet), 4P, 3P (completion of a second sheet), 6P, 5P (completion of a third sheet), 8P, 7P (completion of a fourth sheet); and 10P, 9P (completion of a fifth sheet).

During high-speed double-sided printing operation, a plurality of sheets are subjected to processing one after another in sequence, with a second sheet being subjected to printing during a period between when a first side of a first single sheet has finished undergoing printing when the first single sheet is inverted to undergo printing on its second side. As exemplified below, the high-speed double-sided printing sequence can be carried out in various forms according to the configuration of an apparatus and specifics of a print job.

For instance, when a print job involving printing 10 (1P-10P) pages of images on five sheets is again to be performed, respective pages are printed in sequence of "2P, 4P, 1P (printing of the first sheet ends), 3P (printing of the second sheet ends), 6P, 8P, 5P (printing of the third sheet ends), 7P (printing of the fourth sheet ends), and 10P, 9P (printing of the fifth sheet ends). In this example, one high-speed double-sided printing sequence is performed every two sheets. Specifically, the first two sheets are subjected to one high-speed double-sided printing sequence. After completion of the sequence, the next two sheets are subjected to high-speed double-sided printing sequence. The final one sheet is subjected to individual double-sided printing.

In another example, when the same print job is performed, the respective pages are subjected to printing in sequence of; for instance, "2P, 4P, 1P (completion of a first sheet); 6P, 3P (completion of a second sheet); 8P, 5P (completion of a third sheet); 10P, 7P (completion of a fourth sheet); and 9P (completion of a fifth sheet). In the example, five sheets are consecutively subjected to printing using one high-speed double-sided printing sequence.

Incidentally, in order to ensure quality of an image, the image forming apparatus generally has an operation to measure a displacement of an image forming position and a density shift and performing image quality control to correct the displacement and the shift. Image quality control is carried out when predetermined control performance conditions are fulfilled; for instance, when a given number of prints have been produced or a given period of time has passed since image quality control was previously performed.

SUMMARY

If image quality control is performed by interrupting the high-speed double-sided printing sequence when the control performance conditions are fulfilled during the course of print job performance, user wait time will be increased, and an advantageous increase in printing speed which results from performance of the high-speed double-sided printing sequence cannot be produced. Conversely, it is possible to delay performance of image quality control until after the print job has been completed. However, this may result in an inability to ensure good image quality.

In view of these circumstances, exemplary embodiments of the present invention may provide an image forming apparatus and an image forming system that allows an assurance of superior image quality without increasing the user's wait time.

An image forming apparatus according to a first aspect comprises: an accepting unit, which accepts a print job; a printing unit, which prints an image on a recording medium in accordance with the print job accepted by the accepting unit, wherein the printing unit performs a high-speed double-sided print processing operation to print an image on a second recording medium during a period between when a first side of a first recording medium is printed and when a second side of the first recording medium is printed when a plurality of recording media are being subjected to double-sided printing; an adjustment unit, which performs an image quality adjustment to adjust image quality achieved during printing; a determination unit that determines whether or not adjustment execution conditions will be fulfilled during performance of the high-speed double-sided print processing operation before the high-speed double-sided print processing operation is initiated; and a control unit, which controls the adjustment unit to perform the image quality adjustment before initiation of the high-speed double-sided print processing operation, which was determined would fulfill the adjustment execution conditions, when the determination unit determines that the adjustment execution conditions will be fulfilled.

DETAILED DESCRIPTION OF EXEMPLARY EMBODIMENTS

An exemplary embodiment of the present invention will now be described with reference to FIGS. 1 through 7.

(Internal Configuration of a Printer)

Figure 1:
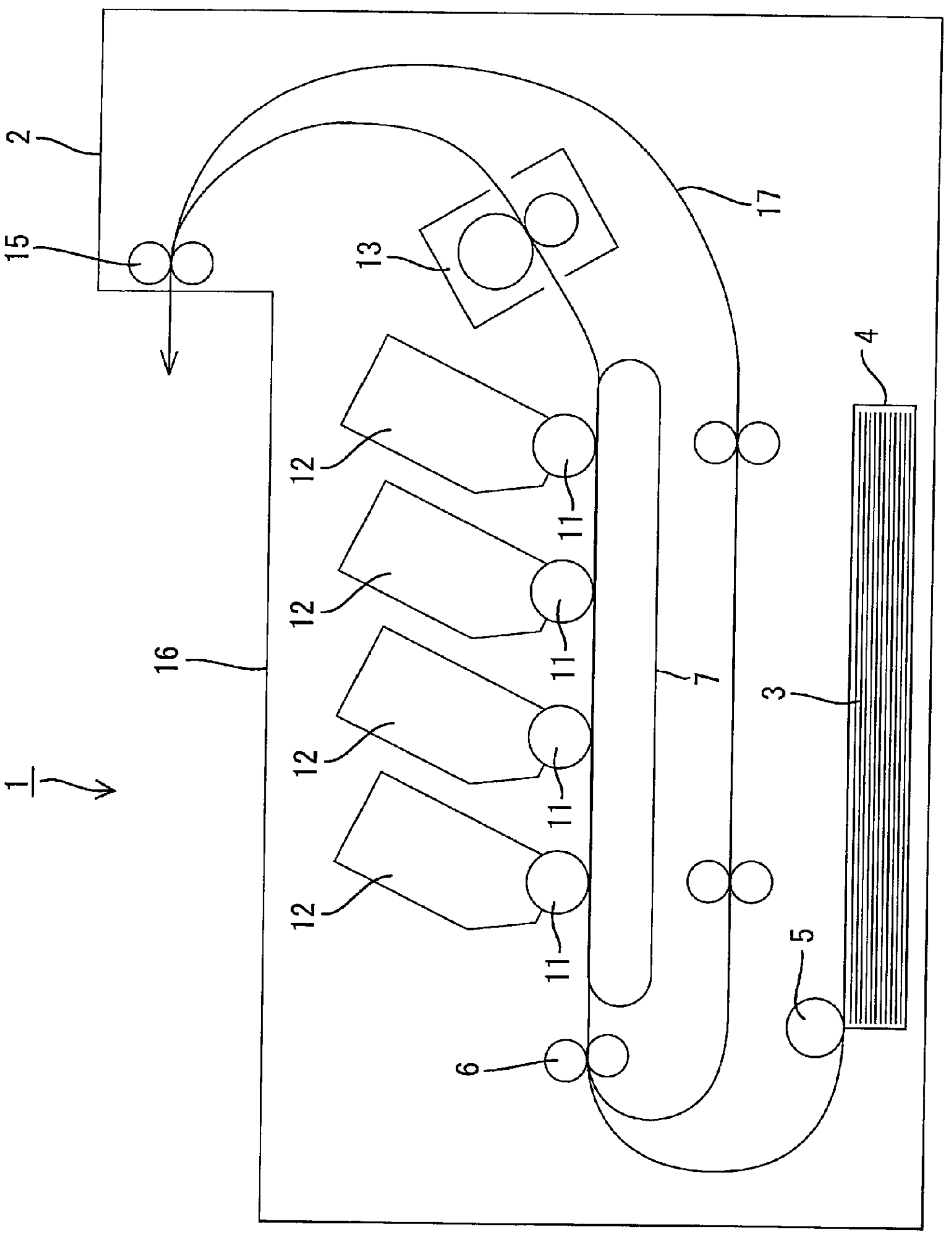
FIG. 1 is a schematic view showing an internal configuration of a printer of an embodiment of the present invention.

FIG. 1 is a schematic view showing an internal configuration of a printer 1 (an example of an image forming apparatus) of the embodiment. In the following descriptions, the left side of FIG. 1 is taken as a front.

As shown in FIG. 1, the printer 1 has a feed tray 4 capable of holding a plurality of sheets 3 (examples of recording media) provided at a bottom of a main unit 2. The sheets 3 placed in the feed tray 4 are fed by a sheet feed roller 5 and conveyed onto a belt 7 using registration rollers 6.

The printer 1 also has a print section 10 capable of producing four print colors using a known electrophotographic method. The print section 10 (example printing unit) has four sets of exposure sections (not shown), four sets of photosensitive elements 11, four sets of development sections 12, and four sets of transfer sections (not shown), all of which are assigned to respective colors, and a pair of fixing sections 13. During a printing operation, the exposure sections expose surfaces of the photosensitive members 11 to light, thereby producing electrostatic latent images. The development sections 12 develop the electrostatic latent images, thereby forming toner images. The transfer sections transfer the toner images onto the sheet 3 conveyed on the belt 7, and the fixing sections 13 fix the toner images.

Output rollers 15 capable of forwardly and backwardly turning are provided at a position in an upper portion of the main unit 2. The print section 10 can perform single-sided printing and double-sided printing. During single-sided printing, the sheet 3 having an image formed on a first side of the sheet by the print section 10 is output onto an output tray 16 provided on an upper surface of the main unit 2 using forward rotation of the output rollers 15. During double-sided printing, the sheet 3 with an image is formed one side by the print section 10 is then fed to a reconveyance path 17 by reverse rotation of the output rollers 15, so that a trailing end of the sheet first enters the reconveyance path. The sheet 3 is again conveyed to the print section 10 from the reconveyance path 17 while being inverted by the registration rollers 6. An image is formed on the second side of the sheet in the print section, and the sheet is subsequently output onto the output tray 16 using forward rotation of the output rollers 15. In the following descriptions, a side of the sheet 3 conveyed during double-sided printing that is first subjected to printing is called a first side, and a side subsequently subjected to printing is called a second side.

(Electrical Configuration of the Printer and a Computer)

Figure 2:
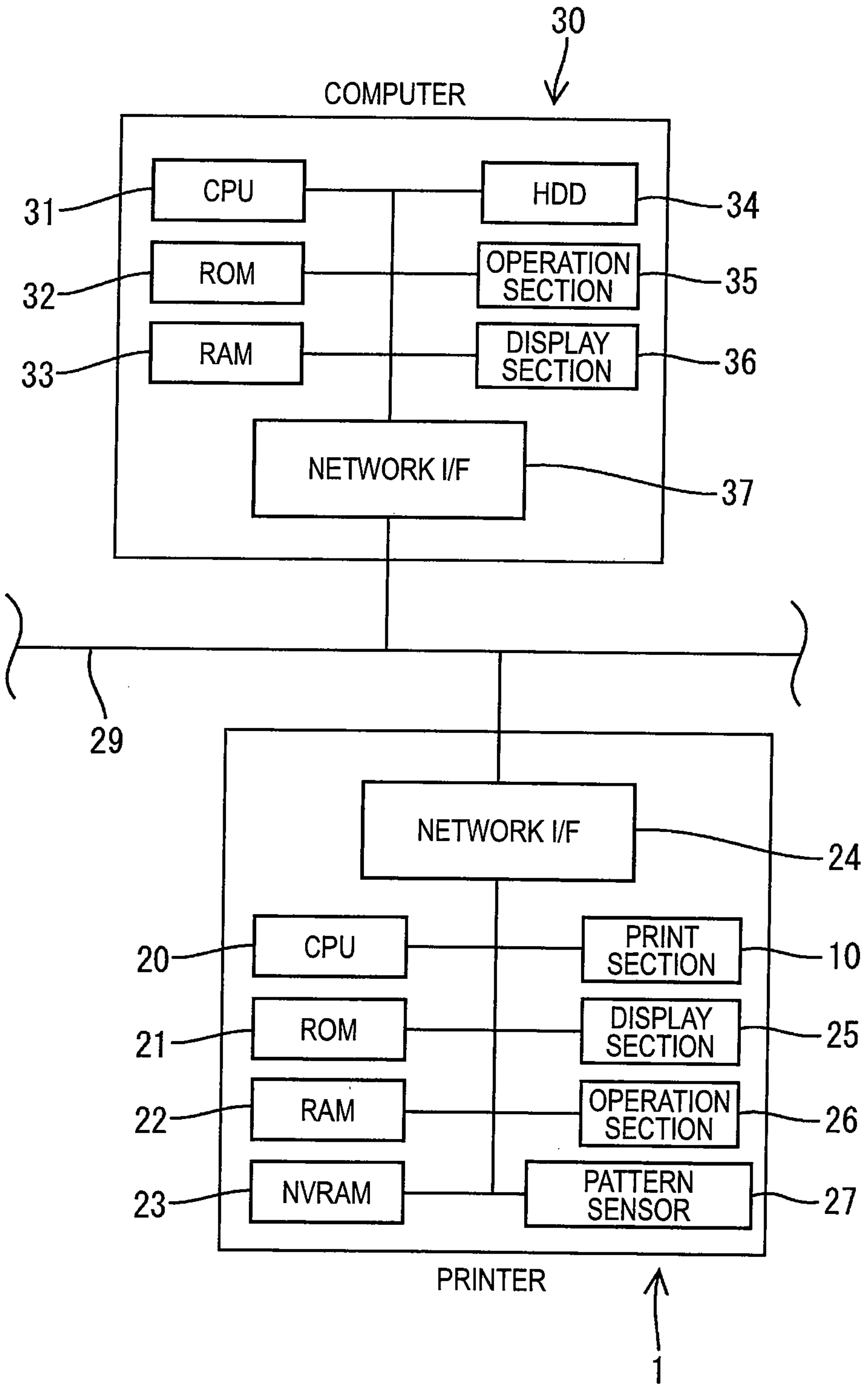
FIG. 2 is a block diagram briefly showing the configuration of the printer of the embodiment and a computer.

FIG. 2 is a block diagram simply showing a configuration of the printer 1 and a configuration of a computer 30 connected to the printer 1.

As illustrated, the printer 1 has a CPU 20, ROM 21, RAM 22, NVRAM (Nonvolatile Memory) 23, and a network interface 24. The elements are connected to the print section 10, a display section 25, an operation section 26, a pattern sensor 27, and the like.

The ROM 21 stores programs for performing various operations of the printer 1, such as print job execution processing to be described later. In accordance with a program read from the ROM 21, the CPU 20 (an example of an accepting unit, adjustment unit, determination unit, and control unit) controls respective sections while storing a processing result in the RAM 22 or the NVRAM 23. The network interface 24 is connected to an external computer 30, and etc., by a communication line 29, which allows mutual data communication.

The display section 25 has a display, lamps, and the like, and can display various setting screens and operating states of the printer. The operation section 26 has a plurality of buttons and can accept entry of various commands from a user. The pattern sensor 27 detects a pattern, or the like, produced on the belt 7.

The computer 30 (an example of an information processor) has a CPU 31 (an example of a generation unit), ROM 32, RAM 33, a hard disk drive 34, an operation section 35 including a keyboard and a pointing device, a display section 36 including a display, a network interface 37 connected to the communication line 29, and the like. Application software for generating image data for printing purposes and other various programs, such as a printer driver, for controlling the printer 1, are stored in the hard disk drive 34.

(Printing Mode of the Printer)

As mentioned previously, the printer 1 can perform single-sided printing and double-sided printing as printing modes. Further, the printer 1 can perform, as double-sided printing performance modes, individual double-sided printing by sequentially subjecting a plurality of sheets to double-sided printing one at a time and high-speed double-sided printing by subjecting second sheet to printing on one side during a time between when a first side of a first sheet and a second side of first sheet is printed. Further two modes are available as the mode for performing high-speed double-sided printing: a definite number mode in which a given number of sheets 3 are processed by one high-speed double-sided printing sequence, and an indefinite number mode in which an indefinite number of sheets 3 are processed by one high-speed double-sided printing sequence.

Figure 3:
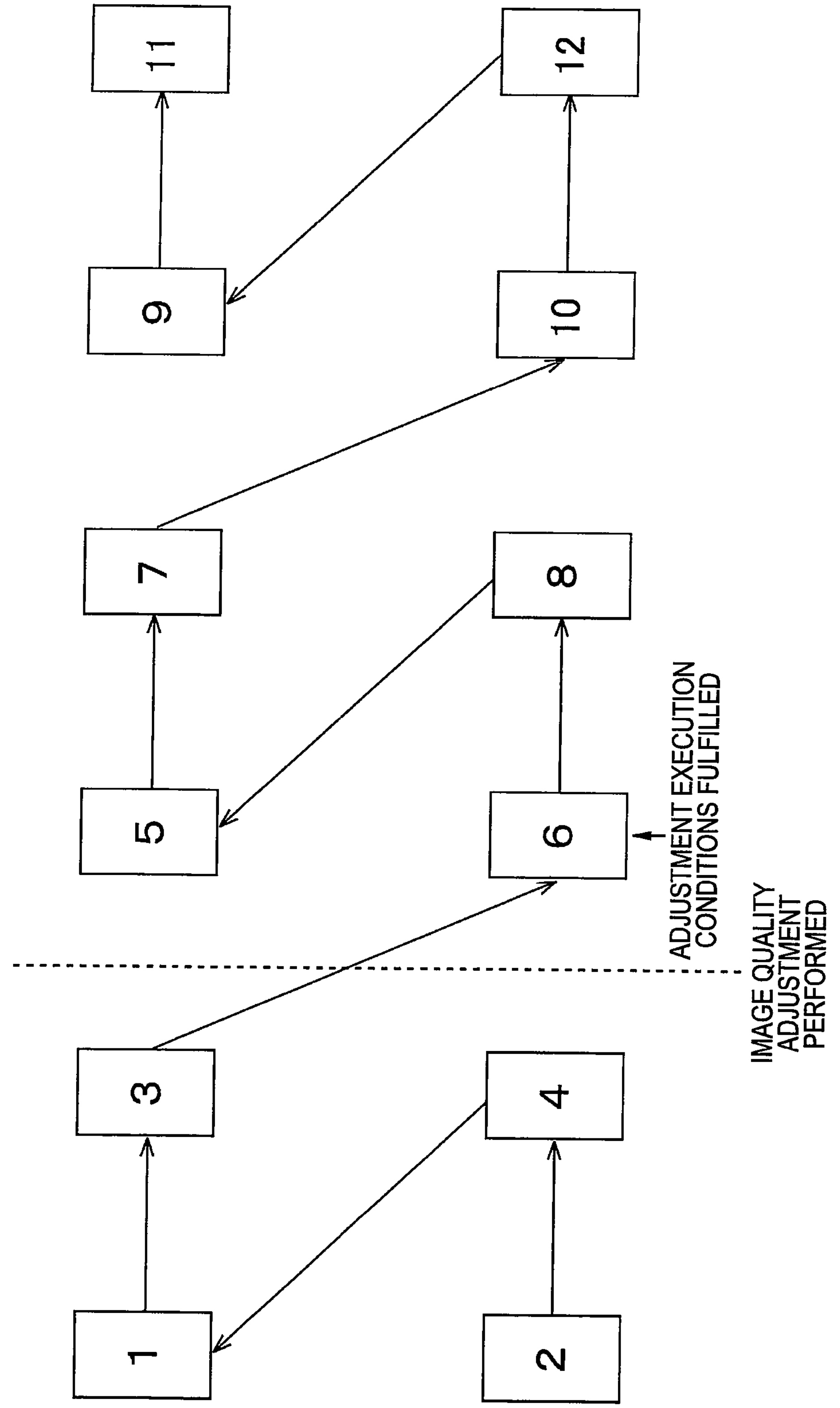
FIG. 3 is a view showing an example print sequence when high-speed double-sided printing is carried out in a definite number mode.

FIG. 3 shows an example print sequence for a case where a print job for printing 12 pages of images on six sheets 3 is performed in the definite number mode of high-speed double-sided printing. As illustrated, in the present embodiment, one high-speed double-sided printing sequence ends after the first two sheets 3 have undergone printing in the sequence of "2P, 4P, 1P, 3P" (a state where the plurality of sheets 3 finished undergoing double-sided printing and where subsequent sheets 3 are not yet subjected to printing is taken as the end of one high-speed double-sided printing sequence as mentioned previously). Thus, in this state both sides of each of the first and second sheets 3 have finished undergoing printing and a sheet 3 is not currently being printed. The next two sheets 3 are then subjected to printing in the sequence of "6P, 8P, 5P, 7P" using the next high-speed double-sided printing sequence. Then, the next two sheets 3 are subjected to printing in the sequence of "10P, 12P, 9P, 11P" using a third high-speed double-sided printing sequence.

In each of the high-speed double-sided printing sequences, two sheets 3 are repeatedly subjected, one after the other, to processing by printing an image on one side of another sheet 3 between when the first and second sides of one sheet 3 are undergoing printing. Therefore, when compared with a case where front and back sides of the sheet 3 are subjected to printing one sheet at a time using individual double-sided printing, the sheets can be subjected to printing at a higher speed.

Figure 4:
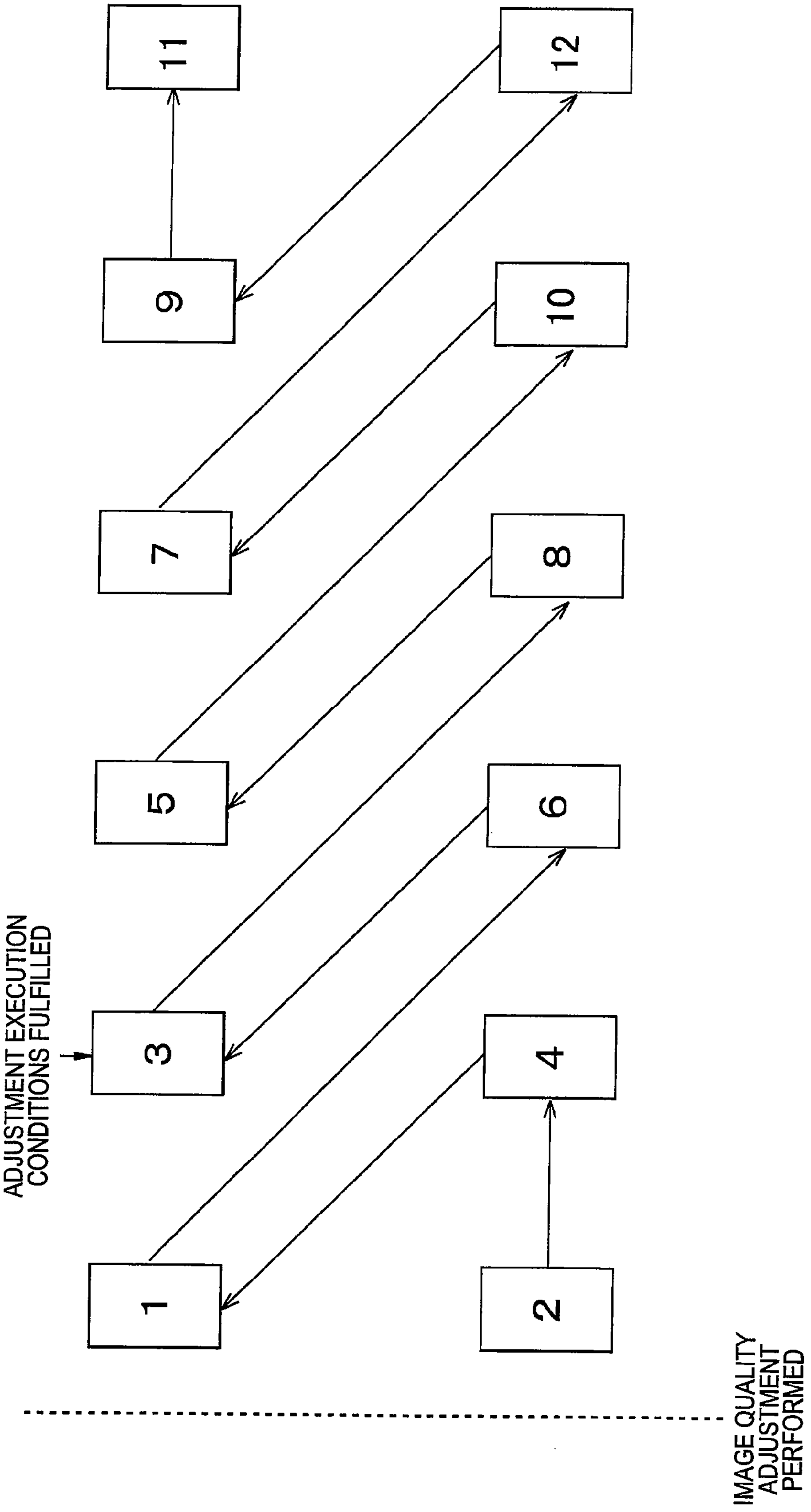
FIG. 4 is a view showing an example print sequence when high-speed double-sided printing is carried out in an indefinite number mode.

FIG. 4 shows an example sequence of printing achieved when a print job analogous to that shown in FIG. 3 is performed in the indefinite number mode of high-speed double-sided printing. As illustrated, in the example, six sheets 3 are consecutively subjected to printing in the sequence of "2P, 4P, 1P, 6P, 3P, 8P, 5P, 10P, 7P, 12P, 9P, 11P" using a single high-speed double-sided printing sequence.

In this high-speed double-sided printing sequence, two pages of images are printed on two other sheets 3 between the printing of the first and second sides of each of the second through fifth sheets 3 undergoing printing, and one page of images is printed on another sheet 3 between the printing of first and second sides of the first and last sheets 3 undergoing printing. Therefore, in this high-speed double-sided printing sequence, printing can be performed at higher speed when compared with a case where front and back sides of the sheet 3 are subjected to printing one sheet at a time using individual double-sided printing. Further, since a larger number of sheets 3 can be continuously subjected to the high-speed double-sided printing sequence in the indefinite number mode than in the definite number mode, processing can be performed at higher speed when compared with the case where processing is performed in the definite number mode.

The CPU 20 can perform a print job by switching between the foregoing various print modes based on the details of each specific print job.

(Print Job Execution Processing)

Figure 5:
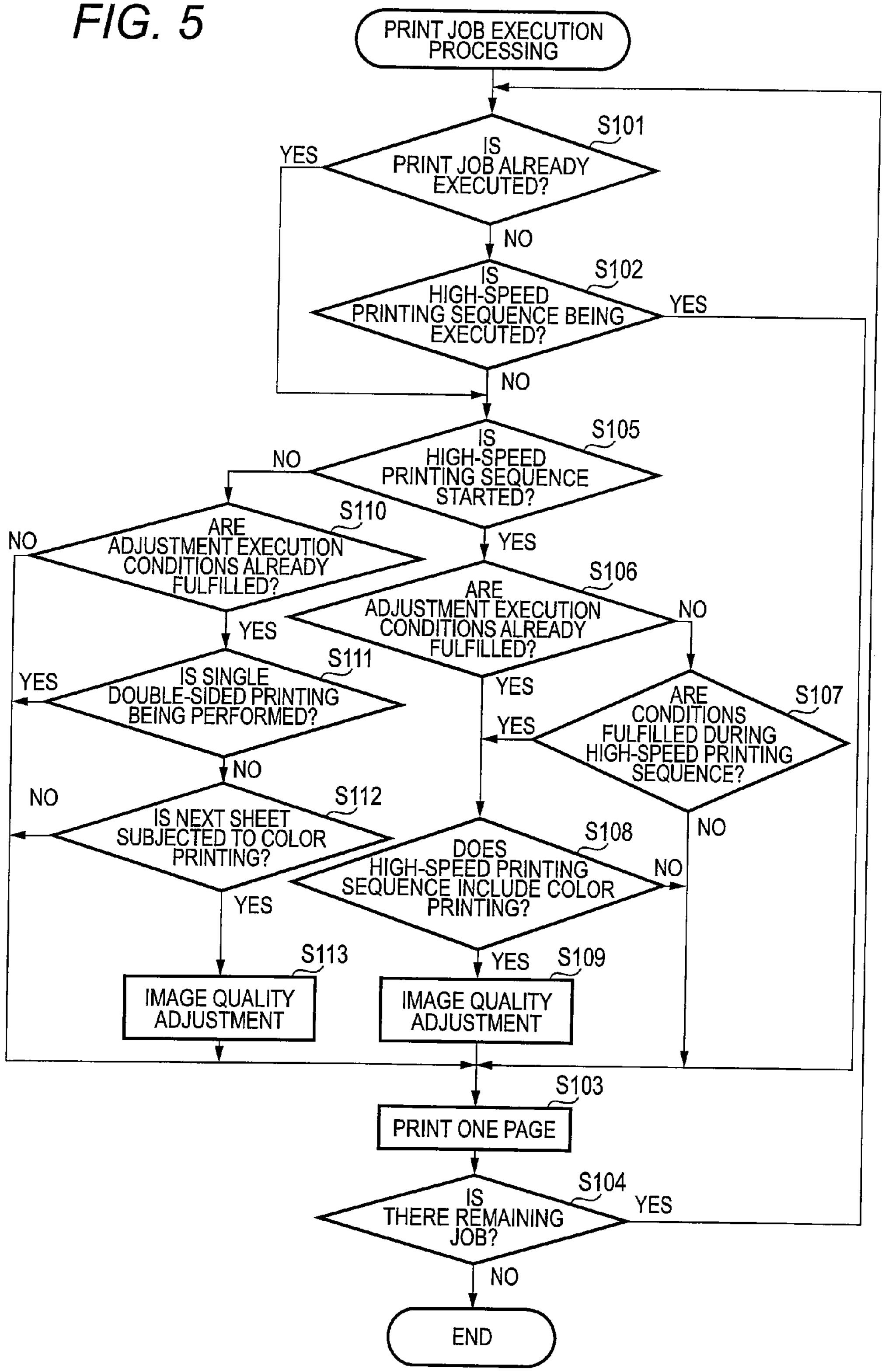
FIG. 5 is a flowchart showing print job execution processing.

FIG. 5 is a flowchart showing print job execution processing performed by the printer 1.

When the user causes the computer 30 to run a printer driver conforming to the printer 1 and enters a print execution command after having set printing conditions, etc., the CPU 31 generates print job data and transmits the data to the printer 1 by way of the network interface 37. In the meantime, upon receipt of a print job transmitted from the computer 30 by way of the network interface 24, the CPU 20 of the printer 1 accepts the print job, registers the job in a print queue, and initiates print job execution processing shown in FIG. 5.

The CPU 20 determines whether or not execution of the print jobs is started using print job execution processing (S101). When the print job is being executed (Yes in S101), the CPU 20 determines whether or not the high-speed double-sided printing sequence (abbreviated as "high-speed printing sequence" in the drawing) is being executed (S102). If the high-speed double-sided printing sequence is being performed (Yes in S102), the high-speed double-sided printing sequence is performed continuously and a next page is printed (S103). When a remaining print job is present (S104), processing returns to S101, where similar processing is iterated.

When execution of the print job is not yet started (No in S101) or when the high-speed double-sided printing sequence is not being performed (No in S102), the CPU 20 determines whether to perform printing of the next page by subsequently initiating the high-speed double-sided printing sequence (S105). When the high-speed double-sided printing sequence is started (Yes in S105), it is determined whether or not adjustment execution conditions are already fulfilled (S106).

The adjustment execution conditions are used to determine whether or not the printer 1 must perform image quality adjustment. The conditions include, for instance, the number of prints produced since previous image quality adjustment, whether the time elapsed since previous image quality adjustment has reached a predetermined reference value, etc. Image quality adjustment is processing performed to ensure the quality of an image, such as a positional displacement correction and a density correction which will be described later.

When the adjustment execution conditions are not fulfilled (Yes in S106), the CPU 20 determines whether or not adjustment execution conditions will be fulfilled in the middle of performance of (one) high-speed double-sided printing sequence which will be started (S107). When the next high-speed double-sided printing sequence is executed in a state where image quality adjustment is not performed, it is determined prior to start of the high-speed double-sided printing sequence whether or not the adjustment execution conditions will be fulfilled in the middle of the performance of the high-speed double-sided printing sequence. When it is determined that the adjustment execution conditions will not be fulfilled in the middle of performance of the high-speed double-sided printing sequence (No in S107), processing proceeds to S103 without performance of image quality adjustment. One page is printed by starting the high-speed double-sided printing sequence.

When the adjustment performance conditions have already been fulfilled in S106 (Yes in S106) or when it is determined that the adjustment execution conditions will be fulfilled during performance of the high-speed double-sided printing sequence in S107 (Yes in S107), the CPU 20 determines whether or not the next (one) high-speed double-sided printing sequence includes color printing (S108). When the next high-speed double-sided printing sequence does not include color printing (No in S108), i.e. when the high-speed double-sided printing sequence corresponds to printing of only monochromatic pages, processing proceeds to S103, where the high-speed double-sided printing sequence is started, to thus print one page. Conversely, when the high-speed double-sided printing sequence includes color printing (Yes in S108), image quality adjustment is performed (S109).

When, for instance positional displacement correction is performed as image quality adjustment, the CPU 20 produces patterns of respective color marks on the belt 7 using the print section 10, detects the amounts of displacement from ideal positions of each of respective colors by measuring positions of the respective marks using the pattern sensor 27, and stores correction values to cancel the displacement in the NVRAM 23. During a printing operation, the CPU 20 reads the correction values stored in the NVRAM 23 and makes corrections to the respective colors of the image forming positions in accordance with the correction values. After the CPU 20 has performed image quality adjustment in S109, processing proceeds to S103, where the high-speed double-sided printing sequence is started to thus print one page.

When the CPU 20 has determined in S105 that the high-speed double-sided printing sequence is not started next time (No in S105), i.e. when the next page is printed using single-sided printing or individual double-sided printing (which is also called "non-high-speed double-sided printing") rather than using the high-speed double-sided printing sequence, it is determined whether or not the adjustment execution conditions have already been fulfilled (S110). When it is determined that the adjustment execution conditions have not been fulfilled (No in S110), processing proceeds to S103 where one page is printed.

When the adjustment execution conditions have been fulfilled (Yes in S110), the CPU 20 determines whether or not individual double-sided printing is currently being performed, i.e. whether or not the second side is next subjected to printing using individual double-sided printing (S111). When it is determined that individual double-sided printing is being currently being performed (Yes in S111), processing proceeds to S103, where the second side undergoes printing. When individual double-sided printing is not currently being performed (No in S111), i.e. when the next page is subjected to printing using single-sided printing or when the first side is subjected to printing using single double-sided printing, it is determined whether or not the sheet 3 subjected to printing using single-sided printing or individual double-sided printing is to be subjected to color printing (S112).

When color printing is not performed (No in S112), i.e. namely, when the next sheet 3 undergoes only monochromatic printing, processing proceeds to S103 without performance of image quality adjustment, and the next page is subjected to printing. Further, when the next sheet 3 is subjected to color printing (Yes in S112), image quality adjustment is performed (S113), and processing subsequently proceeds to S103, where one page is printed.

In S104, when a print job does not remain, i.e. when printing of all print jobs registered in the print queue is completed (No in S104), the CPU 20 completes print job execution processing.

As mentioned above, in print job execution processing, it is determined, before initiation of the high-speed double-sided printing sequence, whether or not the adjustment execution conditions will be fulfilled during performance of the high-speed double-sided printing sequence. When the adjustment execution conditions will be fulfilled and when the high-speed double-sided printing sequence includes color printing, image quality adjustment is performed to adjust image quality adjustment before initiation of the high-speed double-sided printing sequence.

For instance, when the plurality of print jobs are consecutively performed using high-speed double-sided printing in the indefinite number mode and when one or more print jobs are performed before the print job including a high-speed double-sided printing sequence, which is determined to fulfill the adjustment execution conditions, image quality adjustment can be performed in the period between two sequentially adjacent print jobs.

When the high-speed double-sided printing sequence, which is determined to fulfill adjustment execution conditions, does not include color printing, image quality adjustment is performed before performance of a high-speed double-sided printing sequence, which does include color printing, or before any non-high-speed print processing. During print job execution processing, when the adjustment execution conditions are fulfilled when a plurality of sheets 3 are continually subjected to non-high speed print processing, image quality adjustment is performed before the next sheet 3 is subjected to color printing.

When the adjustment execution conditions have already been fulfilled (Yes in S106) and when the adjustment execution conditions will be fulfilled during performance of the high-speed double-sided printing sequence (Yes in S107), image quality adjustment may also be performed (S109) at any time by omitting a determination as to whether or not the high-speed double-sided printing sequence includes color printing (S108). A determination as to whether or not the next sheet 3 is subjected to color printing (S112), which would otherwise be performed when non-high speed print processing is performed, is omitted. When adjustment execution conditions have been fulfilled, image quality adjustment may also be performed immediately after fulfillment of the adjustment execution conditions (S113).

In a case where high-speed double-sided printing is performed in the definite number mode using print job execution processing, when it is determined that the adjustment execution conditions will be fulfilled during performance of the second high-speed double-sided printing sequence (in the middle of printing of pages five to eight) as shown in FIG. 3, image quality adjustment is performed after completion of the first high-speed double-sided printing sequence and before initiation of the second high-speed double-sided printing sequence.

Figure 6:
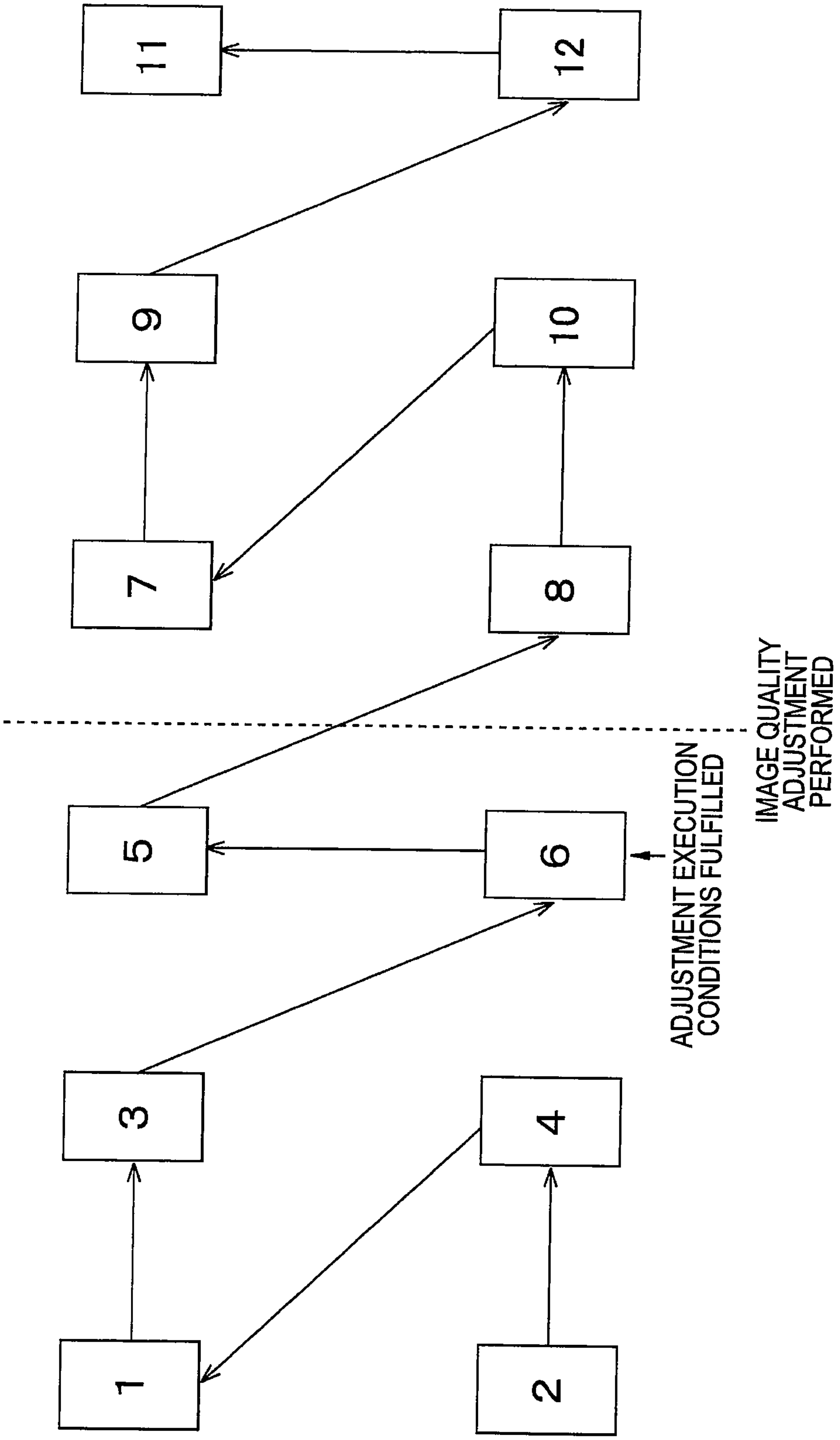
FIG. 6 is a view showing a print sequence when high-speed double-sided printing is performed in the definite number mode in a comparative example.

Conversely, FIG. 6 shows a comparative example of printing sequence for a case where image quality adjustment is performed immediately if a determination is made during performance of the high-speed double-sided printing sequence as to whether or not the adjustment execution conditions are fulfilled and if the conditions are determined to have been fulfilled. In this example, when the adjustment execution conditions are determined to be fulfilled during performance of the second high-speed double-sided printing sequence (at the time of printing of the sixth page), feeding of the next sheet 3 from the feed tray 4 is stopped. After the fifth page has been printed on the second side of a sheet 3 then undergoing printing, the high-speed double-sided printing sequence is interrupted, and an image quality adjustment is performed.

After performance of image quality adjustment, the fourth and fifth sheets 3 are subjected to printing by using high-speed double-sided printing sequence, and the final sheet 3 is subjected to printing using individual double-sided printing. In this example, the second high-speed double-sided printing sequence was interrupted, and individual double-sided printing was performed twice instead. Therefore, this processing involves the consumption of more time as compared with the operation shown in FIG. 3.

In a case where high-speed double-sided printing is performed at the indefinite number mode using print job execution processing, when adjustment execution conditions are determined to have been fulfilled during performance of the high-speed double-sided printing sequence (at the time of printing of the third page) as shown in, for instance, FIG. 4, image quality adjustment is performed before initiation of the high-speed double-sided printing sequence.

Figure 7:
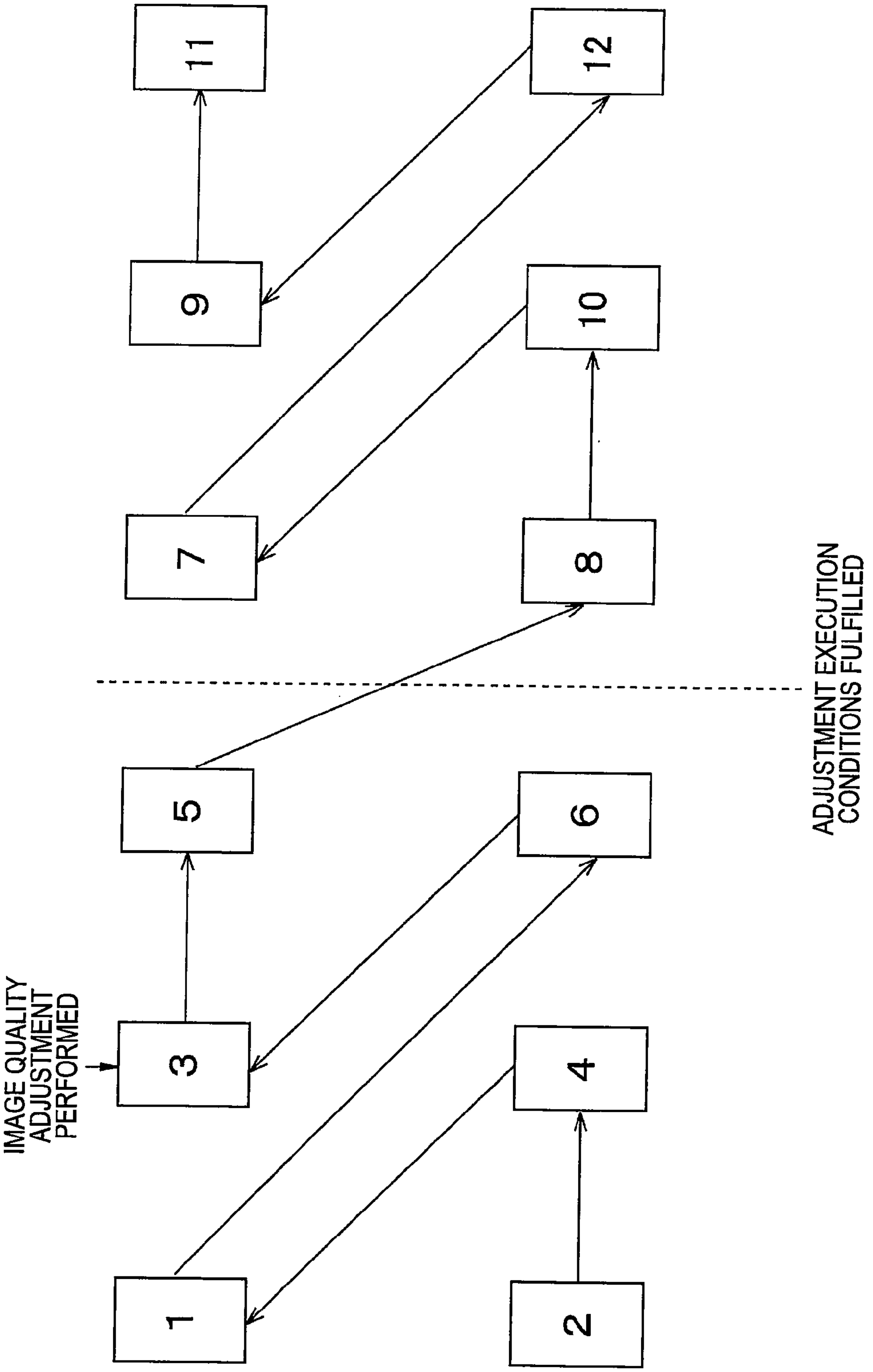
FIG. 7 is a view showing a print sequence when high-speed double-sided printing is performed in the indefinite number mode in the comparative example.

Conversely, FIG. 7, similar to FIG. 6, shows as a comparative example of a printing sequence for a case where image quality adjustment is performed immediately if a determination is made during performance of the high-speed double-sided printing sequence, as to whether or not the adjustment execution conditions are fulfilled and if the conditions are determined to have been fulfilled. In this example, when the adjustment execution conditions are determined to be fulfilled during printing of the third page, image quality adjustment is performed by interrupting the high-speed double-sided printing sequence after printing of the fifth page on the second side of the sheet 3 undergoing printing.

After performance of image quality adjustment, the fourth to sixth sheets 3 are subjected to printing using individual high-speed double-sided printing sequence. In this embodiment, the high-speed double-sided printing sequence, which should have been performed by one high-speed double-sided printing sequence, is interrupted and performed while divided into two operations. For this reason, this processing involves the consumption of more as compared with the operation shown in FIG. 4.

As mentioned above, exemplary embodiments of print job performance processing according to the present invention may enable prevention of an increase in user's wait time, which would otherwise be caused by performance of image quality adjustment, when compared with the comparative examples shown in FIGS. 6 and 7.

As mentioned above, according to an embodiment of the present invention, it is determined whether or not adjustment execution conditions will be fulfilled during high-speed double-sided print processing (the high-speed double-sided printing sequence) before the high-speed double-sided print processing is performed. When it is determined that the adjustment execution conditions will be fulfilled, image quality adjustment is performed before initiation of the high-speed double-sided print processing. Image quality adjustment is performed before fulfillment of the adjustment execution conditions and thereby superior image quality can be assured. Since interruption of high-speed double-sided print processing can be avoided, an increase in user's wait time can be prevented.

When a given number of sheets 3 are repeatedly subjected to high-speed double-sided print processing a plurality of times, image quality adjustment is performed during a period between sequentially adjacent high-speed double-sided printing operations. Image quality adjustment can thereby be performed at a time at which high-speed double-sided print processing of the given number of sheets 3 is not interrupted.

When one print job or more is practiced before the print job including high-speed double-sided print processing which are determined will fulfill the adjustment execution conditions, image quality adjustment can be practiced as during a period between the sequentially adjacent two print jobs. Performing image quality adjustment during a period between print jobs makes it possible to prevent interruption of print jobs.

When the adjustment execution conditions are fulfilled during performance of non-high-speed print processing of at least one of one-sided printing and individual double-sided printing, image quality adjustment is performed after performance of non-high-speed print processing that fulfills the adjustment execution conditions. When the adjustment execution conditions are fulfilled during performance of non-high-speed print processing performed one recording medium at a time, image quality adjustment is performed after completion of non-high-speed print processing, whereby image quality can be assured. Further, when compared with the case where high-speed double-sided print processing is interrupted, an influence of an increase in wait time is considered to be small.

When high-speed double-sided print processing, which is determined will fulfill the adjustment execution conditions, includes color printing, image quality adjustment is performed before the high-speed double-sided print processing is performed. Conversely, when the high-speed double-sided print processing does not include color printing, image quality adjustment is performed after the high-speed double-sided printing, which is determined will fulfill the adjustment execution conditions, is completed. Higher image quality generally tends to be required during color printing as compared to monochromatic printing. Therefore, when high-speed double-sided print processing includes color printing, superior image quality can be assured by performing image quality adjustment prior to high-speed double-sided print processing. Further, when high-speed double-sided print processing does not include color printing, image quality adjustment is not performed until high-speed double-sided print processing ends, whereby performance of image quality adjustment of low degree of necessity can be avoided.

Another Embodiment

The present invention is not limited to the above descriptions and drawings. For instance, embodiments, such as those provided below, also fall within the technical scope of the present invention.

(1) The above embodiment provides that the printer forms an image using electrophotography. However, the present invention can also use an image forming apparatus of another type, for instance an inkjet image forming apparatus. Further, the present invention can also apply to an image forming apparatus not having a color printing function. Moreover, the present invention can also apply to a case involving, for instance printing data received using a facsimile, printing data acquired by a scanner (copying), and printing data acquired from an external storage medium (direct printing) as print jobs.

(2) The present embodiment provides positional displacements are carried out as image quality adjustment. However, according to the present invention, a deviation in density for image formation, for instance may be measured, and density correction to correct the deviation may also be performed. In the case of, for instance, an electrophotographic image forming apparatus, cleaning of a photosensitive drum, a belt, and the like, may also be performed as image quality adjustment. In the case of an inkjet image forming apparatus, cleaning of a head nozzle, and the like, may also be performed.

(3) The embodiment shows an application of the present invention to an image forming apparatus. As shown in FIG. 2 however, the present invention can apply to, for instance, an image forming system having the printer 1 (an image forming apparatus) and the computer 30 (the information processor). In this case, for instance, the CPU 31 of the computer 30 may also perform processing for determining, from information acquired from the printer 1 by way of the network interface 37, whether or not the adjustment execution conditions will be fulfilled during performance of high-speed double-sided print processing. Further, the CPU 31 may also perform processing for transmitting a command for performing image quality adjustment, to the printer 1 before initiation of high-speed double-sided print processing, which is determined will fulfill the adjustment execution conditions when it is determined that the adjustment execution conditions will be fulfilled.

(4) A print mode (single-sided printing and double-sided printing, individual double-sided printing and high-speed double-sided printing, or a definite number mode and an indefinite number mode of high-speed double-sided printing) employed when a print job is performed can be switched, as appropriate, according to, for instance specifics of a print job, the configuration of the apparatus, the size of a recording medium, memory consumption, and the like. The printer may automatically determine switching, or switching may also be performed according to the settings made by the user. The number of recording mediums processed by one high-speed double-sided printing in the constant number mode and the number of recording mediums simultaneously being held during high-speed double-sided print processing can be changed as appropriate. The present invention can also apply to an image forming apparatus capable of performing only one either high-speed double-sided print processing in the definite number mode and high-speed double-sided print processing in the indefinite number mode. Further, the present invention can also apply to an image forming apparatus that performs high-speed double-sided print processing of another mode.

(5) Adjustment execution conditions are not limited to those previously mentioned and can also be changed as required. Example adjustment execution conditions concerning the amount of operation of an apparatus and a status change can be used. A plurality of conditions can also be used in combination. In particular, in the present invention, conditions for diminishing the likelihood of fulfillment of the adjustment execution conditions after image quality adjustment has been performed are effective.

What is claimed is:

1. An image forming apparatus comprising:

a printing unit configured to print an image on a recording medium in accordance with a print job, wherein the printing unit performs a high-speed double-sided print processing operation to print an image on a second recording medium during a period between when a first side of a first recording medium is printed and when a second side of the first recording medium is printed when a plurality of recording media are being subjected to double-sided printing, wherein the print job includes a plurality of high-speed double-sided print processing operations including the high-speed double-sided print processing operation;

a processing unit;

memory having executable instructions stored thereon that, when executed by the processing unit, cause the image forming apparatus to function as:

an accepting unit, which accepts the print job;

an adjustment unit, which performs an image quality adjustment to adjust image quality achieved during printing;

a determination unit that determines whether or not adjustment execution conditions will be fulfilled during performance of the high-speed double-sided print processing operation before the high-speed double-sided print processing operation is initiated; and a control unit, which controls the adjustment unit to perform the image quality adjustment before initiation of the high-speed double-sided print processing operation, which was determined would fulfill the adjustment execution conditions, when the determination unit determines that the adjustment execution conditions will be fulfilled, wherein the control unit controls the adjustment unit to perform the image quality adjustment during a period between sequentially adjacent high-speed double-sided print processing operations when repeatedly subjecting a given number of recording media to high-speed double-sided print processing a plurality of times.

2. The image forming apparatus according to claim 1, wherein the control unit controls the adjustment unit to perform the image quality adjustment during a period between two sequentially adjacent print jobs when performing one or more print jobs prior to performing a print job, which includes the high-speed double-sided print processing operation, which the determination unit determined would fulfill the adjustment execution conditions.

3. The image forming apparatus according to claim 1, wherein the printing unit also performs a non-high speed print processing operation, which includes at least one of a single-sided printing operation to print an image on only one side of a recording medium and an individual double-sided printing operation to print an image on both sides of each of a plurality of recording media one recording medium at a time; and wherein, when the adjustment execution conditions are fulfilled during the non-high-speed print processing operation, the control unit controls the adjustment unit to perform the image quality adjustment after performance of the non-high-speed print processing operation, which fulfilled the adjustment execution conditions.

4. The image forming apparatus according to claim 1, wherein the control unit controls the adjustment unit to perform the image quality adjustment before the high-speed double-sided print processing operation only when the high-speed double-sided print processing operation, which determination unit determined would fulfill the adjustment execution conditions, includes color printing, and wherein the control unit controls the adjustment unit to not perform the image quality adjustment before the high-speed double-sided print processing operation, which was determined would fulfill the adjustment execution conditions, when the high-speed double-sided print processing operation does not include color printing.

5. The image forming apparatus according to claim 1, wherein the image quality adjustment includes at least one of a positional displacement correction operation, which measures a displacement of an image formation position and corrects the displacement, and a density correction operation, which measures a deviation from an image formation density and corrects the deviation.

6. An image forming system comprising:

a first processing unit, which generates a print job;

a printing unit configured to print an image on a recording medium in accordance with an accepted print job, wherein the printing unit performs a high-speed double-sided print processing operation to print an image on a second recording medium during a period between when a first side of a first recording medium is printed and when a second side of the first recording medium is printed when a plurality of recording media are being subjected to double-sided printing, wherein the accepted print job includes a plurality of high-speed double-sided print processing operations including the high-speed double-sided print processing operation;

a second processing unit;

memory having executable instructions stored thereon that, when executed by the second processing unit, cause the image forming apparatus to perform operations including:

an accepting unit, which accepts the print job generated by the first processing unit as the accepted print job;

an adjustment unit, which performs an image quality adjustment to adjust image quality achieved during printing;

a determination unit that determines whether or not adjustment execution conditions will be fulfilled during performance of the high-speed double-sided print processing operation before the high-speed double-sided print processing operation is initiated; and a control unit, which controls the adjustment unit to perform the image quality adjustment before initiation of the high-speed double-sided print processing operation, which was determined would fulfill the adjustment execution conditions, when the determination unit determines that the adjustment execution conditions will be fulfilled, wherein the control unit controls the adjustment unit to perform the image quality adjustment during a period between sequentially adjacent high-speed double-sided print processing operations when repeatedly subjecting a given number of recording media to high-speed double-sided print processing a plurality of times.

7. An image forming apparatus comprising:

a printing unit configured to print an image on a recording medium in accordance with a print job, wherein the printing unit performs a high-speed double-sided print processing operation to print an image on a second recording medium during a period between when a first side of a first recording medium is printed and when a second side of the first recording medium is printed when a plurality of recording media are being subjected to double-sided printing, wherein the print job includes a plurality of high-speed double-sided print processing operations including the high-speed double-sided print processing operation;

a processing unit;

memory having executable instructions stored thereon that, when executed by the processing unit, cause the image forming apparatus to perform operations including:

accepting the print job;

determining whether adjustment execution conditions will be fulfilled during performance of the high-speed double-sided print processing operation before the high-speed double-sided print processing operation is initiated; and causing image quality adjustment to be performed before initiation of the high-speed double-sided print process operation, which was determined would fulfill the adjustment execution conditions, when determining that the adjustment execution conditions will be fulfilled, wherein the operation of causing the image quality adjustment to be performed includes causing the image quality adjustment to be performed during a period between sequentially adjacent high-speed double-sided print processing operations when repeatedly subjecting a given number of recording media to high-speed double-sided print processing a plurality of times.

8. The image forming apparatus according to claim 7, wherein the operation of causing the image quality adjustment to be performed includes causing the image quality adjustment to be performed during a period between two sequentially adjacent print jobs when performing one or more print jobs prior to performing a print job, which includes the high-speed double-sided print processing operation, which was determined would fulfill the adjustment execution conditions.

9. The image forming apparatus according to claim 7, wherein the printing unit is configured to perform a non-high speed print processing operation, which includes at least one of a single-sided printing operation to print an image on only one side of a recording medium and an individual double-sided printing operation to print an image on both sides of each of a plurality of recording media one recording medium at a time; and wherein, when the adjustment execution conditions are fulfilled during the non-high-speed print processing operation, the operation of causing the image quality adjustment to be performed includes causing the image quality adjustment to be performed after performance of the non-high-speed print processing operation, which fulfilled the adjustment execution conditions.

10. The image forming apparatus according to claim 7, wherein the operation of causing the image quality adjustment to be performed includes causing the image quality adjustment to be performed before the high-speed double-sided print processing operation only when the high-speed double-sided print processing operation, which was determined would fulfill the adjustment execution conditions, includes color printing, and wherein the operation of causing the image quality adjustment to be performed includes causing the image quality adjustment to not be performed before the high-speed double-sided print processing operation, which was determined would fulfill the adjustment execution conditions, when the high-speed double-sided print processing operation does not include color printing.

11. The image forming apparatus according to claim 7, wherein the image quality adjustment includes at least one of a positional displacement correction operation, which measures a displacement of an image formation position and corrects the displacement, and a density correction operation, which measures a deviation from an image formation density and corrects the deviation.

* * * * *